Figure 1:
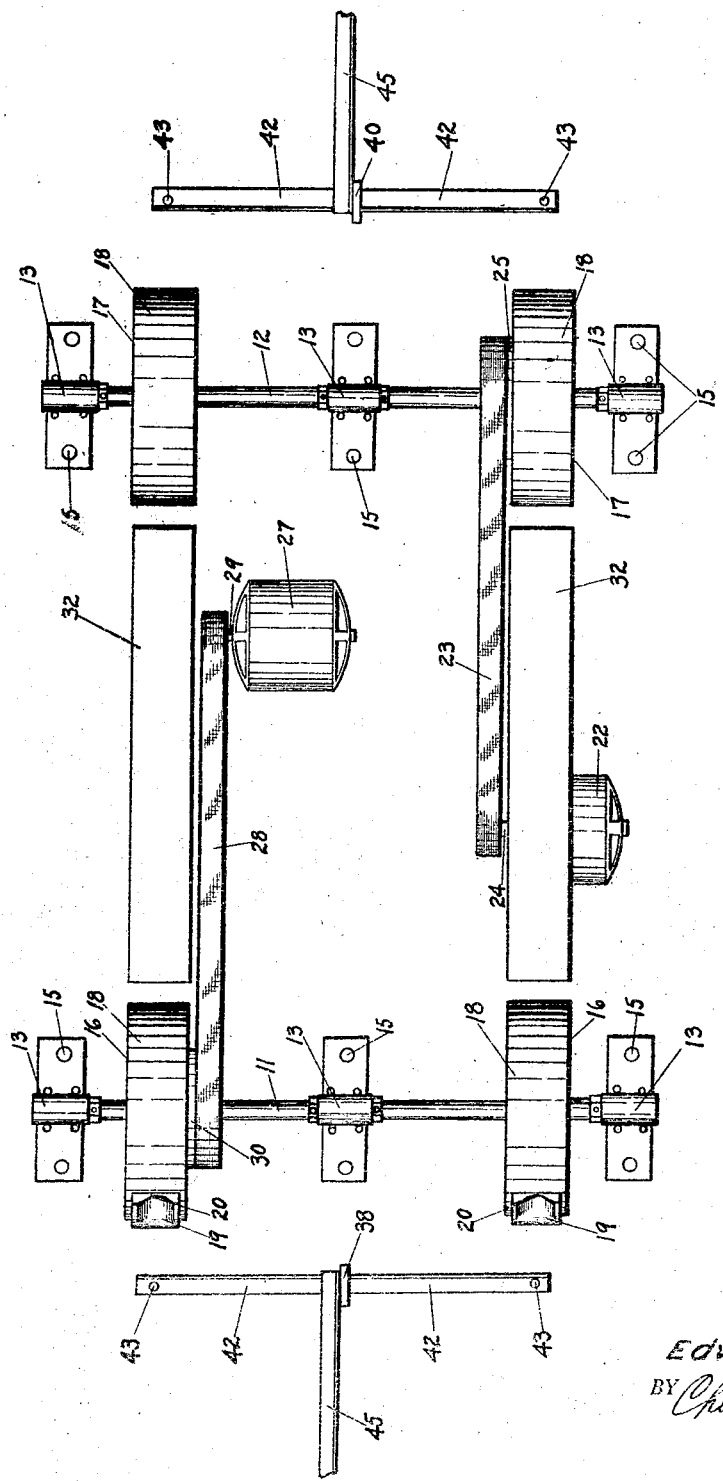

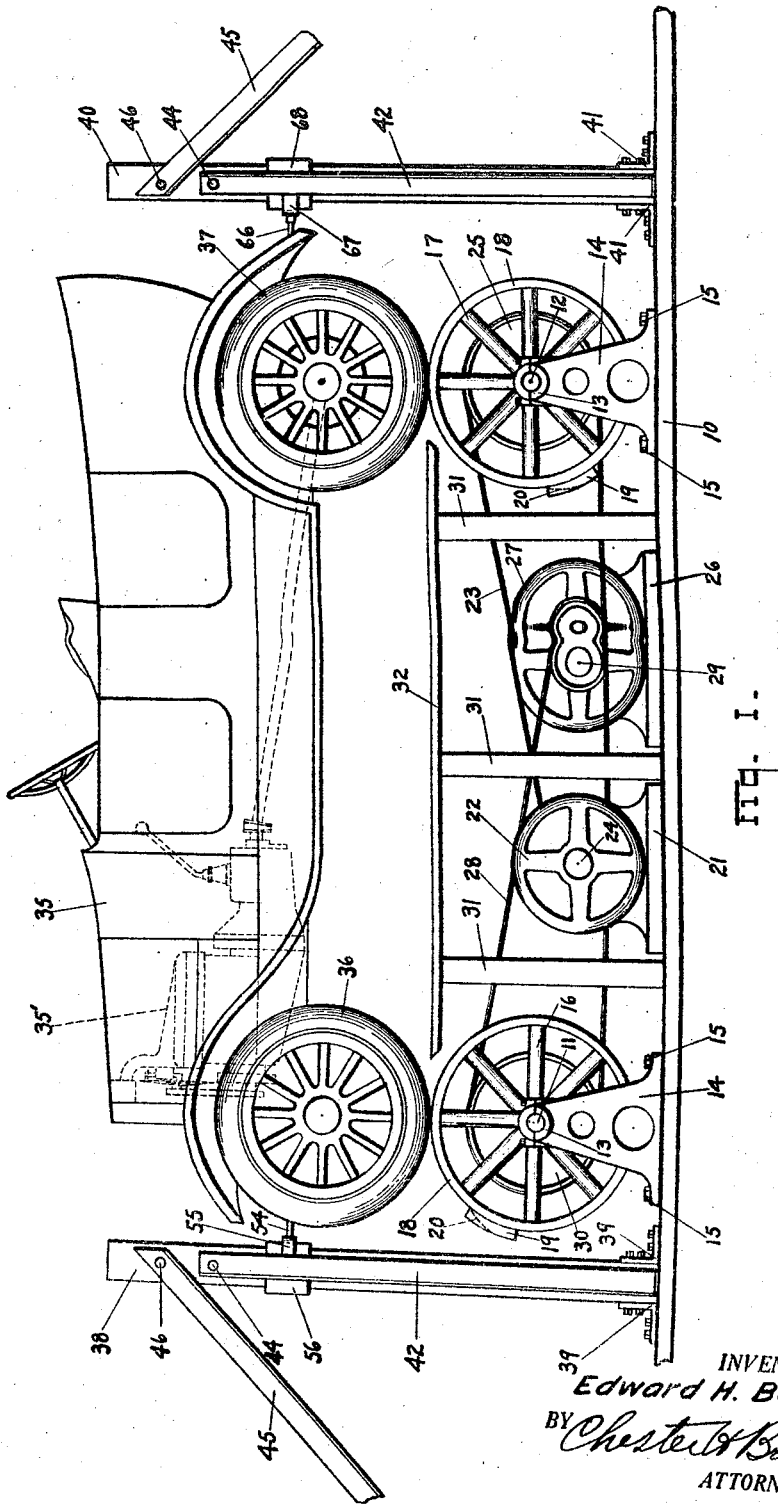

Oct. 14, 1924.

E. H. BELDEN

AUTOMOBILE TESTING APPARATUS

Filed Jan. 13, 1919  4 Sheets-Sheet 2

1,511,496

INVENTOR.
Edward H. Belden
BY
ATTORNEY

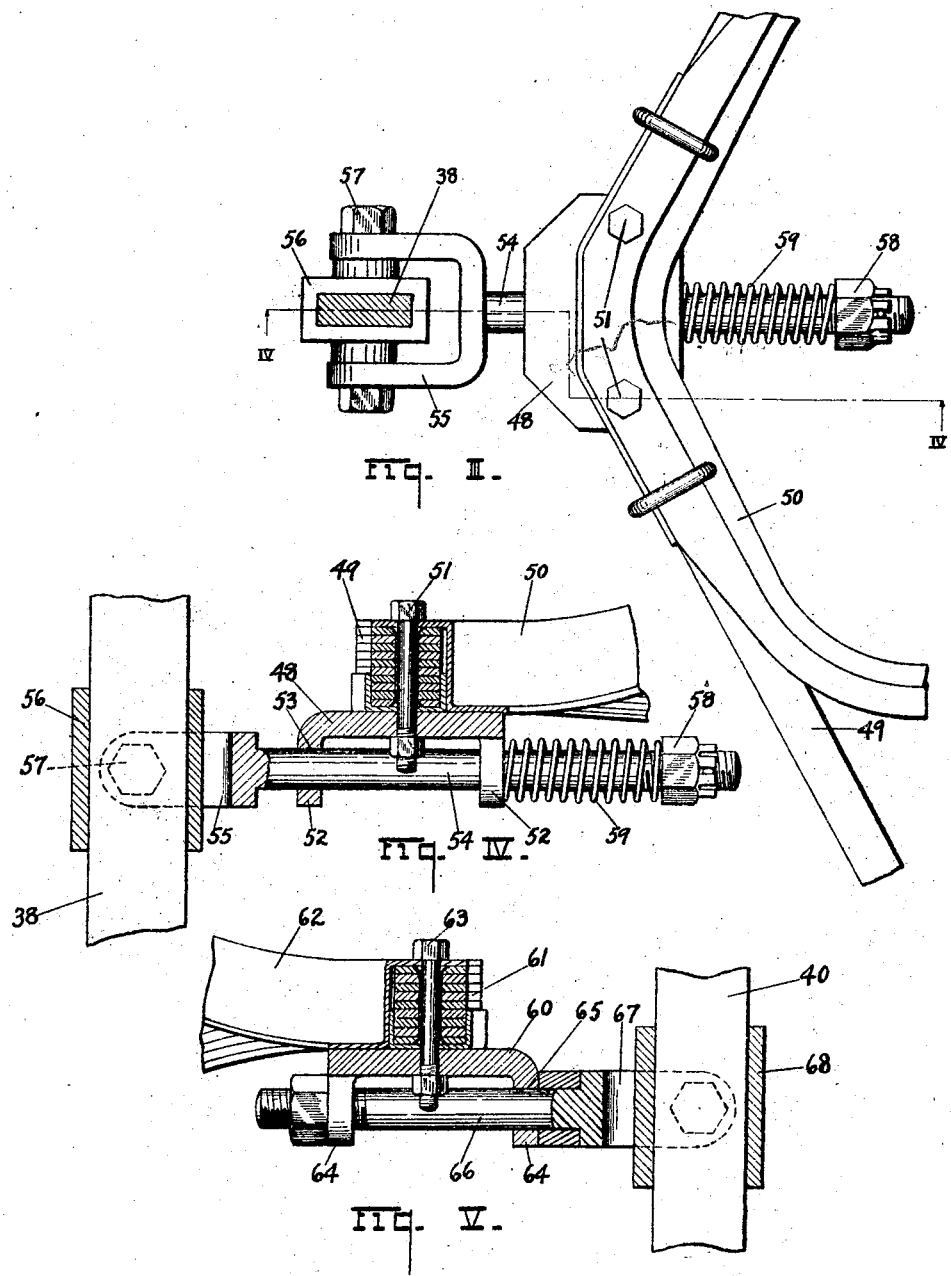

Oct. 14, 1924.
E. H. BELDEN
1,511,496
AUTOMOBILE TESTING APPARATUS
Filed Jan. 13, 1919    4 Sheets-Sheet 4
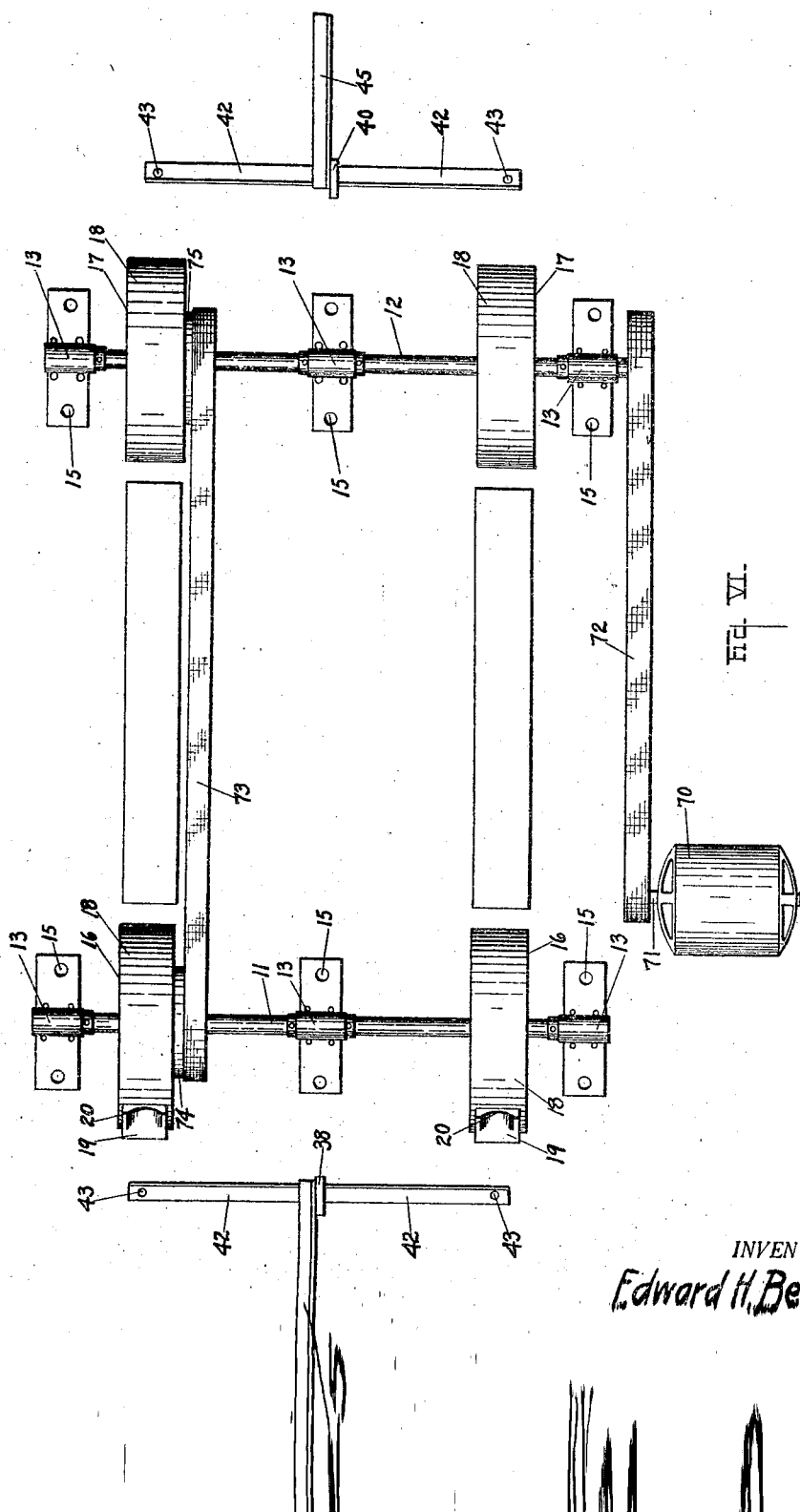
FIG. VI.
INVENTOR.
Edward H. Belden Patented Oct. 14, 1924.

1,511,496

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

AUTOMOBILE TESTING APPARATUS.

Application filed January 13, 1919. Serial No. 270,887.

*To all whom it may concern:*

Be it known that I, EDWARD H. BELDEN, residing at Toledo, county of Lucas, and State of Ohio, have invented certain new and useful Improvements in Automobile Testing Apparatus, of which I declare the following to be a full, clear, and exact description.

This invention relates to an improved automobile testing apparatus, particularly designed for the purpose of testing automobiles under conditions which will approximate those of actual road service.

One object of this invention is to provide an improved apparatus of the character described, which is adapted to set up vibrations in an automobile for the purpose of testing the same.

Further object of this invention is to provide an apparatus of the character described for testing automobiles, which may be operated from the engine of the automobile.

A further object of this invention is to provide a device of the character described for testing automobiles, the parts of which may be constructed and operated in such a manner as to set up vertical, transverse, or fore and aft vibration in an automobile which is to be tested.

A further object of this invention is to provide improved means for properly positioning an automobile upon the testing apparatus.

A further object of this invention is to provide improved means for retaining an automobile in proper position upon the testing apparatus during the progress of the test.

Further objects of this invention relate to economies of manufacture and details of construction as will hereinafter appear from the detailed description to follow.

I accomplish the objects of my invention in one instance by the devices and means described in the following specification, but it is evident that the same may be varied widely without departing from the scope of the invention, as pointed out in the appended claims.

A structure constituting one embodiment of the invention, which may be the preferred, is illustrated in the accompanying drawing forming a part hereof, in which:

Figure I is a side elevation of the improved testing apparatus, showing the position of the parts with respect to an automobile positioned thereon.

Figure II is a top plan view of the improved testing apparatus, the automobile shown in Fig. I being removed to better illustrate the position of the parts.

Fig. III is a detail view, partially in section, showing the means for attaching the front end of the automobile to one of the upright supports.

Fig. IV is a sectional view taken along the line IV—IV of Fig. III.

Fig. V is a vertical-sectional view of the connecting means employed for connecting the rear portion of the automobile to one of the upright supports.

Fig. VI is a top plan view of a modified form of testing apparatus, wherein the parts are operated from a single motor.

It has been found to be desirable in the testing of automobiles to subject an automobile to strains and stresses approximating those to which it would be subjected under ordinary conditions on the road. The objects of such a test are to develop any weaknesses in the automobile construction to determine if the various parts are properly proportioned to stand the strains to which they will be subjected, and to determine whether the materials employed are of a proper quality to satisfactorily sustain the various stresses and strains to which they will be subjected under actual working conditions. In order to obtain a thorough and complete test of this character, it was formerly considered necessary to drive the automobile for a considerable distance over a rough road in order to properly test the endurance of the various parts and bring out the structural weaknesses if any existed. By the use of this improved testing apparatus the long and difficult road test may be dispensed with, and the car subjected to a variety of different strains and stresses which will adequately test the endurance of the various parts, and at the same time subject the structure of the automobile to more intense and severe strains in a comparatively short period of time than would be possible in the most severe road tests lasting over a period of months.

By means of this improved testing apparatus, the test may be conducted continuously and the structure of the automobile may be under close observation at all times in order to observe the immediate results of the stresses and strains to which the structure is subjected, and these strains and stresses may be varied from time to time as may be deemed expedient.

Referring to the drawings, similar reference characters refer to corresponding parts throughout the several views, and the sectional view is taken looking in the direction of the small arrows at the ends of the section line.

10 designates the foundation or flooring upon which the various parts of the apparatus are mounted. The elements which go to make up the testing apparatus are preferably securely bolted to the foundation or flooring. Front and rear axles 11 and 12 are spaced apart a sufficient distance to approximately correspond with the distance between the front and rear axles of the automobile to be tested, and each of these axles is supported in a plurality of bearings 13 formed in the upper ends of supporting standards 14. Each of the standards 14 is firmly secured to the foundation or flooring by means of bolts 15. Two or more supporting posts and bearings may be employed for supporting each shaft, and if it is found desirable, the front and rear shafts may be divided and each portion may be driven separately.

A pair of wheels 16 are firmly secured to the shaft 11 in such a manner as to prevent rotation of the wheels relative to the shaft and in a similar manner a pair of wheels 17 are secured to the rear shaft 12. The wheels of each set are spaced a suitable distance from each other to correspond with the tread of the automobile which is to be tested. Each of these wheels is provided with a relatively wide rim 18, each of said rims carrying firmly secured to its outer face a block 19 provided with an inclined groove 20. Mounted on a base 21 is a motor 22 which may be of the constant speed type, and which is adapted to drive the shaft 12 through a belt 23 carried by the motor shaft 24 and passing over a pulley 25 firmly secured to the shaft 12. Mounted upon the base 26 is a second motor 27 which may be of a constant speed type or of a variable speed type, and which is adapted to drive the shaft 11 by means of a belt 28 carried by the motor shaft 29, and passing over a pulley 30 mounted upon the shaft 11.

While in my preferred form I have illustrated a motor connected to each of the shafts for driving the shafts separately, it is to be understood that any suitable driving means may be employed, and that the two shafts may be directly connected to each other in order that one of the shafts may be driven from the other shaft at the same or different speed. A plurality of standards 31 supports a track 32 upon each side of the testing apparatus, the said track extending between the front and rear wheels 16 and 17 upon each side of the apparatus and terminating at such a point as not to interfere with the rotation of the wheels and the blocks 19 carried thereby. These tracks are provided for the purpose of furnishing a convenient means for the positioning of an automobile upon the testing apparatus in proper position to be tested. When it is desired to test an automobile by means of this apparatus, a pair of skids may be employed and the automobile elevated in proper position upon the apparatus by being pushed up over the skids, the front wheels of the automobile running along the tracks 32, until they are in proper position over the front wheels 16.

When the automobile has been placed in position, as shown in (Fig. I), upon the testing apparatus and secured in that position by means hereinafter to be described, the front and rear wheels 16 and 17 of the testing apparatus may be caused to rotate in such a direction that the inclined portion 20 of the blocks 19 will first pass under the wheels of the automobile whereupon the automobile wheels will be raised from the wheels 16 and 17 and as the blocks 19 pass thereunder, the automobile wheels will suddenly drop back to their original positions and a jar be communicated to the automobile structure. The blocks 19 positioned upon the rear wheels 17 may be secured at corresponding points in the periphery of these wheels so that both sides of the rear end of the automobile will drop back into position at the same time. In a similar manner the two blocks 19 upon the front wheels 16 may be positioned at corresponding points on the rim of these wheels so that the vibration communicated to the front wheels of the automobile will be simultaneous.

It will be obvious that the rear wheels 17 may be rotated at the same speed as the front wheels 16 or at different speed. If the rear wheels 17 are rotated at the same speed as the front wheels 16, the position of the blocks 19 upon the front and rear wheels may be so arranged that they will pass from under the various automobile wheels at the same time, thus resulting in communicating a vibration to each part of the automobile at once. If it is desired, however, the blocks 19 positioned upon the front wheels 16 may be set at such a point as to pass under the front wheels of the automobile at a different time from that in which the blocks 19 upon the wheels 17 pass from under the rear wheels of the automobile, thus communicating a fore and aft or longitudinal vibration to the automobile structure in addition to the vertical vibration. It will also be understood that the blocks 19 upon the rear wheels 17 may be so positioned upon the wheels as to pass from under the rear wheels of the automobile at different times instead of simultaneously, and in a similar manner the blocks 19 positioned upon the front wheels 16 may be so arranged as to pass under the front wheels of the automobile at different times. In this way transverse vibrations may be communicated to the automobile structure in addition to the vertically directed vibrations, as the wheels drop from their corresponding blocks. When the front and rear axle shafts 11 and 12 are rotated separately, they may be rotated at different speed and thus a similar result attained by varying the period of the vibration communicated to the front and rear portions of the automobile.

It will be evident, therefore, that the device may be arranged in such a manner as to communicate periodic vibrations to the entire automobile, the vibrations affecting the different parts being capable of being varied by different arrangements of the means for communicating the vibrations to the different parts so that they will operate at different times. In this manner it is possible to communicate a series of periodic vibrations acting in a vertical direction upon the automobile, and a series of fore and aft vibrations acting from front to rear of the automobile structure, or a series of transverse vibrations acting from side to side of the automobile, or various different combinations of these vibratory impressions as is desired.

The automobile designated by the numeral 35 is provided with an engine 35', front wheels 36 and rear wheels 37 adapted to be positioned upon the front wheels 16 and rear wheels 17 respectively of the testing apparatus when in operative position for testing. An upright supporting post 38 is positioned near the front portion of the testing apparatus, and is firmly secured to the foundation or flooring by angular brackets 39. A similar post 40 is positioned near the rear of the testing apparatus and is secured to the flooring by angular brackets 41. Transverse braces 42 are secured to the flooring by bolts 43 and to the uprights 38 and 40 by bolts 44, for the purpose of bracing the same from movement in a transverse direction. A longitudinal brace 45 is attached to each of the uprights by a bolt 46 and is adapted to prevent movement of the uprights in a longitudinal direction. A plate 48 is adapted to be secured to the front springs 49 and the front frame portion 50 by means of a pair of bolts 51. The plate 48 is provided with a pair of depending ears 52, each of which is provided with an opening 53 for the reception of a bolt 54. The bolt 54 is provided with a forked end 55, the portions of which embrace a sleeve member 56, adapted to slide upon the upright post 38, and are pivotally secured thereto by bolt 57. A nut 58 is threaded upon the end of the bolt 54 and adapted to be secured in a variety of adjusted positions thereupon. A coiled spring 59 encircles the bolt 54, one end of the spring bearing against one ear 52, and the other end thereof bearing against the nut 58.

A plate 60 is secured to the rear spring 61 and a portion of the rear frame of the automobile 62 by means of bolts 63, in a manner similar to that in which the plate 48 is secured to the front portion 50 of the automobile. The plate 60 is provided with a pair of depending ears 64, each of which is provided with an opening 65 for the reception of a bolt 66. The bolt 66 is provided with a forked end 67, the portions of which are secured to a sleeve 68 sliding upon the rear upright standard 40 in a similar manner to that in which the forked end 55 of the bolt 54 is secured to the sleeve 56. The sleeves 56 and 68 are mounted in such a manner as to slide freely upon the upright supports 38 and 40 respectively, thus permitting the automobile to move vertically under the vertical impulses transmitted thereto by the wheels 16 and 17. The bolts 54 and 66 are mounted for pivotal movement in the depending ears of the plates 48 and 60 respectively, thus permitting a slight rotation of the automobile about its longitudinal axis under impulses directed thereagainst by the wheels 16 and 17, tending to set up transverse vibration in the automobile. The pivotal connection of the forked end of the bolts 54 and 66 with the sleeve members 56 and 68 respectively permits a slight longitudinal rocking movement of the movement of the automobile under the influence of impulses tending to set up longitudinal vibrations therein. The spring 59 allows for a slight lengthening of the connections under the influence of a fore and aft rocking movement of the automobile and tends to return the automobile to its horizontal position upon the cessation of these impulses.

In the modification shown in (Fig. VI) the motor 70 is provided with a shaft 71, which is operatively connected with the rear shaft 12 by a belt 72 or other suitable power transmission means. The rear shaft 12 is connected with the front shaft 11 by endless belt 73 passing over pulleys 74 and 75 rigidly secured to the front and rear shafts respectively. With the construction shown in (Fig. VI) the front and rear shafts 11 and 12 are constantly rotated at the same speed relative to each other, and variations in the vibrations communicated to the automobile may therefore be produced by changing the position of blocks 19 upon one or more of the wheels 16 and 17 relative to each other. If the blocks 19 upon the wheels 17 are correspondingly positioned with respect to these wheels, and the blocks upon the wheels 16 are correspondingly positioned upon these wheels, but so arranged that they contact with the wheels of the automobile at a different time than that in which the wheels of the automobile are engaged by the blocks 19 mounted upon the wheels 17, vibrations will be set up in the automobile in a longitudinal direction thereof, or there will be a tendency to rock the automobile in a fore and aft direction. If desired, however, the blocks 19 may be so arranged upon the wheels 16 and 17 that each block will contact with its corresponding automobile wheel at the same time and thus result in setting up direct vertical vibrations in the automobile to be tested. It is evident that by varying the position of the several blocks upon their respective wheels, a variety of different strains and stresses can be induced in the automobile frame upon rotation of the wheels 16 and 17.

In the modification shown in (Fig. VI) the engine of the automobile may be employed for the purpose of driving the testing apparatus, since the engine 35' being operatively connected to the rear wheels 37 of the automobile will rotate the same and by means of the frictional engagement between the wheels 37 and the rear wheels 17 of the testing apparatus, together with the endless belt 73, rotation will be transmitted to the various wheels of the testing apparatus in the same manner as when the testing apparatus is operated from a separate motor.

When it is desired to test an automobile the upright supporting post 40 may be removed and skids positioned upon the rear surfaces of the wheels 17, and the foundation or flooring, whereupon the automobile may be placed in position upon the testing apparatus by being run up over the skids, the forward wheels of the automobile traveling over the tracks 32 until the front and rear automobile wheels are positioned upon the front and rear wheels 16 and 17 of the testing apparatus. The rear upright support 40 is then placed in its original position as shown in (Fig. I), and firmly secured to the flooring. The connections between the front and rear of the automobile and the supporting posts 38 and 40 are then secured in position for retaining the automobile in its proper place upon the testing apparatus. The shafts 11 and 12 of the testing apparatus may then be rotated either by separate motors or by a single motor, or from power taken from the engine of the automobile through the rear automobile wheels 37 in a manner previously described. As previously stated, a variety of different arrangements of the blocks 19 upon the wheels 16 and 17 may be employed for the purpose of varying the direction of the stresses and strains set up in the automobile by the vibration.

It will be seen that as the wheels 16 and 17 are of substantially equal size and the blocks 19 are of substantially the same thickness, the vibrations communicated to the various wheels will be of practically the same degree, that is, the force of the jar communicated to the various wheels will be substantially the same. The wheels 16 and 17 being each provided with one block 19 when each of the wheels 16 and 17 revolves at a constant speed the vibrations communicated to the automobile are periodic, that is, the vibratory movements communicated to one wheel of the automobile by each wheel of the testing apparatus occurs at substantially regular intervals. When the front and rear wheels 16 and 17 revolve at different speeds or when the blocks on those wheels are so arranged that the front and rear automobile wheels are actuated at different times the periods of the vibrations imparted to the front and rear wheels are alternated.

It will be evident that by operating the testing mechanism from the engine of the automobile, an endurance test of the automobile engine may be conducted simultaneously with the endurance test for indicating the strength of the various structural elements and their power to resist stresses and strains.

While I have shown and described in considerable detail a specific embodiment of my invention, it is to be understood that this showing and description is illustrative only, and for the purpose of rendering my invention more clear and that I do not regard the invention as limited to the details of construction illustrated or described, nor any of them, except in so far as I have included such limitations within the terms of the following claims, in which it is my intention to claim all novelty inherent in my invention broadly as well as specifically.

Having thus described my invention, what I claim as new and desire to secure by Letters Patent, is:

1. In an apparatus of the class described, a supporting wheel, a block mounted upon said wheel for imparting vibration to the automobile wheel supported thereon, said block having an inclined surface on one side substantially meeting the periphery of the wheel, the opposite side being formed to afford a precipitous drop for the automobile wheel to the surface of the supporting wheel.

2. In an apparatus of the class described, front and rear shafts, supporting wheels mounted thereon, and spaced apart to form bases for supporting the wheels of an automobile, means for imparting vibrations to the automobile upon rotation of the supporting wheels, and means for rotating the front and rear shafts at the same or different speeds.

3. In an apparatus of the class described, front and rear shafts, supporting wheels mounted thereon and spaced apart to form bases for supporting the wheels of an automobile, raised tracks between the front and rear supporting wheels, and means for imparting vibration to the automobile upon rotation of the supporting wheels.

4. In a device of the class described, a post, and means for connecting a portion of an automobile frame thereto comprising a sleeve slidable on the post, a member pivotally connected with the sleeve, and cushioning means between the pivoted member and the automobile frame.

5. In a device of the class described, a post and means for connecting a portion of an automobile frame thereto comprising a member pivotally connected with the post, and cushioning means between the pivoted member and the automobile frame at the median line thereof for retaining the parts in proper position relative to each other.

6. In a device of the class described, a plurality of rotatable members, each positioned directly beneath and forming a support for one of the wheels of an automobile, devices carried by said members for engaging the wheels of the automobile and communicating vibrations thereto, and means for rotating certain of said members at a different speed from that at which the remaining members are rotated.

7. In an automobile testing device wherein the automobile is subjected to vertical vibrations, an upright post, a connector adapted to be mounted on the frame of an automobile comprising a rod and a sleeve, the latter having a sliding connection with said post.

In testimony whereof, I affix my signature.

EDWARD H. BELDEN.